US005781903A

United States Patent [19]

Rusterholz

[11] Patent Number: 5,781,903

[45] Date of Patent: Jul. 14, 1998

[54] SYSTEM AND METHOD FOR REORDERING LOOKUP TABLE ENTRIES WHEN TABLE ADDRESS BITS ARE INVERTED

[75] Inventor: John T. Rusterholz, Roseville, Minn.

[73] Assignee: Cadence Design Systems, Inc., San Jose, Calif.

[21] Appl. No.: 775,795

[22] Filed: Dec. 31, 1996

[51] Int. Cl.[6] ........ G06F 17/30

[52] U.S. Cl. ........ 707/100; 382/232

[58] Field of Search ........ 707/1, 100, 101, 707/102, 103, 104, 200; 382/232, 244, 248, 254, 115; 395/500; 345/422

[56] References Cited

U.S. PATENT DOCUMENTS 5,088,033 2/1992 Binkley et al. ........ 395/500
5,331,394 7/1994 Shalon et al. ........ 356/124
5,596,686 1/1997 Duluk, Jr. ........ 345/422
5,636,292 6/1997 Rhoads ........ 382/232
5,710,834 1/1998 Rhoads ........ 382/232

*Primary Examiner*—Thomas G. Black
*Assistant Examiner*—Ruay Lian Ho
*Attorney, Agent, or Firm*—Fenwick & West LLP

[57] ABSTRACT

A computer-based system and method for efficiently identifying inverted bits in an address, utilizing a single technique to rearrange any size table, generating new index bit sequences based upon inverted index bits without utilizing a significant amount of memory resources, and rearranging table entries only once. The present invention utilizes a mask that defines the address bits that are inverted for a new table. The present invention then rearranges the table entries in the old table to form a new table. Once generated the new table can be used in place of the old table thereby requiring no more memory than the old table. Accordingly, the present invention provides a system and method for identifying the index bits to be inverted after the lookup table and computer program have been generated while utilizing significantly less memory than conventional systems and methods.

14 Claims, 7 Drawing Sheets

| | New Index | Old Index | Current Mask Bit | OldT(OI) | NewT(NI) |
|---|---|---|---|---|---|
| (a) | 1001 | 0000 | -- | A | -- |
| (b) | 1001 | 0000 | -- | A | A |
| (c) | 1000 | 0000 | 1 | A | -- |
| (d) | 1000 | 0001 | 1 | B | -- |
| (e) | 1000 | 0001 | -- | B | B |
| (f) | 1001 | 0001 | 1 | B | -- |
| (g) | 1011 | 0001 | 0 | B | -- |
| (h) | 1011 | 0010 | 0 | C | -- |
| (i) | 1011 | 0010 | -- | C | C |
| (j) | 1010 | 0010 | 1 | C | -- |
| (k) | 1010 | 0011 | 1 | D | -- |
| (l) | 1010 | 0011 | -- | D | D |
| (m) | 1011 | 0011 | 1 | D | -- |
| (n) | 1001 | 0011 | 0 | D | -- |
| (o) | 1101 | 0011 | 0 | D | -- |
| (p) | 1101 | 0100 | 0 | E | -- |
| (q) | 1101 | 0100 | -- | E | E |

YZ

| WX | 00 | 01 | 10 | 11 |
|---|---|---|---|---|
| 00 | A | B | C | D |
| 01 | E | F | G | H |
| 10 | I | J | K | L |
| 11 | M | N | O | P |

Figure 1

| $\overline{W}X$ | 00 | 01 | 10 | 11 |
|---|---|---|---|---|
| 00 | I | J | K | L |
| 01 | M | N | O | P |
| 10 | A | B | C | D |
| 11 | E | F | G | H |

Figure 2(a)

$Y\overline{Z}$

| $\overline{W}X$ | 00 | 01 | 10 | 11 |
|---|---|---|---|---|
| 00 | J | I | L | K |
| 01 | N | M | P | O |
| 10 | B | A | D | C |
| 11 | F | E | H | G |

Figure 2(b)

| WXYZ | $\overline{W}XY\overline{Z}$ |
|---|---|
| 0000 | 1001 |
| 0001 | 1000 |
| 0010 | 1011 |
| 0011 | 1010 |
| 0100 | 1101 |
| 0101 | 1100 |
| 0110 | 1111 |
| 0111 | 1110 |
| 1000 | 0001 |
| 1001 | 0000 |
| 1010 | 0011 |
| 1011 | 0010 |
| 1100 | 0101 |
| 1101 | 0100 |
| 1110 | 0111 |
| 1111 | 0110 |

Figure 3

| | New Index | Old Index | Current Mask Bit | OldT(OI) | NewT(NI) |
|---|---|---|---|---|---|
| (a) | 1001 | 0000 | -- | A | -- |
| (b) | 1001 | 0000 | -- | A | A |
| (c) | 1000 | 0000 | 1 | A | -- |
| (d) | 1000 | 0001 | 1 | B | -- |
| (e) | 1000 | 0001 | -- | B | B |
| (f) | 1001 | 0001 | 1 | B | -- |
| (g) | 1011 | 0001 | 0 | B | -- |
| (h) | 1011 | 0010 | 0 | C | -- |
| (i) | 1011 | 0010 | -- | C | C |
| (j) | 1010 | 0010 | 1 | C | -- |
| (k) | 1010 | 0011 | 1 | D | -- |
| (l) | 1010 | 0011 | -- | D | D |
| (m) | 1011 | 0011 | 1 | D | -- |
| (n) | 1001 | 0011 | 0 | D | -- |
| (o) | 1101 | 0011 | 0 | D | -- |
| (p) | 1101 | 0100 | 0 | E | -- |
| (q) | 1101 | 0100 | -- | E | E |

Figure 7

SYSTEM AND METHOD FOR REORDERING LOOKUP TABLE ENTRIES WHEN TABLE ADDRESS BITS ARE INVERTED

CROSS REFERENCE TO RELATED APPLICATION

This application is related to co-pending U.S. patent application Ser. No. 08/777,596, filed by John T. Rusterholz on Dec. 31, 1996, entitled "System and Method for Reordering Lookup Table Entries When Table Address Bits are Reordered", Applicant's reference number 2614, which is incorporated by reference herein in its entirety.

BACKGROUND OF THE INVENTION

1. Field of the Invention

The present invention relates generally to the field of computer aided design/computer aided engineering (CAD/CAE), more particularly to the field of data array reordering in a CAD/CAE environment.

2. Description of Background Art

Computer aided design (CAD) and computer aided engineering (CAE) systems frequently increase computational speed by invoking a table (array) lookup technique. The table lookup technique is generally used to compute the results of a function having the following characteristics: (a) the function is repeated a large number of times; (b) for each computation the aggregate of the input to the function (domain) is a few bits, e.g., 4–16 bits; and (c) the output (range) can be represented by a few bytes, e.g., 1–8 bytes, for example. To implement the function, all possible results of the function (or a meaningful subset thereof) are calculated in advance and stored as a table (array) in a memory module of a computer. A methodology utilizing the table, as described below, is generated and stored in a computer readable format, e.g., as a computer program stored in a memory module of a computer, as firmware, or hardwired in computer hardware. For ease of discussion, the following description will presume the methodology is stored as a computer program. However, it will be apparent to persons skilled in the art that alternate techniques can be used to implement the computer based methodology of the present invention. The computer program catenates all of the bits that comprise the input to the function in a prescribed order, e.g., bits represented by w, x, y, z. These bits are treated as an integer in the range of zero to $2^N-1$, where N is equal to the number of input bits. This integer is used as an index (address) into the table (array) of pre-computed results. The results of the function are determined using a single memory reference to the table plus the time required to assemble the input bits. The time required to generate the results of the function using the table-lookup technique is typically significantly less than having the computer invoke the logic necessary to perform the function.

In complex CAD/CAE environments the success of the table-lookup technique frequently depends upon knowing the order of the address bits at the time the lookup-table is generated. In many computer-based disciplines the optimal order of the address bits is known when the table is generated because the address formation and the table contents are under the control of the programmer. Frequently, the optimal ordering of inputs is not determined until after the lookup-table and the simulation software have been generated. In this situation, it is not economically feasible to re-generate all of the, possibly thousands, of lookup-tables used in the computer program to match the new arrangement of input bits. Further complicating the problem is that the number of input bits for each lookup-table can vary significantly. One technique for rearranging lookup table entries after the table and program have been generated is set forth in the related patent application described above.

Another problem occurs when certain bits in the address are inverted. Logic networks typically include inverters. In addition, state devices within a logic network frequently have both true and complement outputs available, whereas the simulated state is represented as a single value. It is possible in complex CAD/CAE simulations, for example, to remove many inversion operations from the simulation by using the complement of certain signals in forming table addresses, and restructuring the lookup tables accordingly. The removal of the inversion operations improves the performance of the simulator. However, in order to remove inversion operations, some lookup tables must be modified to account for the different signal representation. The modification of the lookup tables is preferably performed after the generation of the lookup table and after the computer program is written. What is needed is a system and method for rearranging the table entries after the table has been generated and after the computer program has been written.

The inversion of address bits does not require the recalculation of a new lookup-table. Instead, inversion of address (input) bits requires merely rearranging the lookup-table entries. For example, an eight entry table can have an index having three address bits (x,y,z) that are catenated in order with "x" as the most significant bit. If the contents of the table can be identified as {A,B,C,D,E,F,G,H} in addresses 0–7 respectively, then x=0, y=0, z=0, yields "A", and x=1, y=1, z=1, yields "H". If it is determined that a CAD/CAE simulation will be more efficient if the "x" and "y" bit are inverted when forming the address, i.e., as (x',y',z), the table entries must be rearranged into the order {G,H,E,F,C,D,A,B} in addresses 0–7 respectively.

FIG. 1 is an illustration of a table (array) having a four bit index. Each bit in the four bit index can be represented as a variable, e.g., w, x, y, and z respectively with "w" as the most significant bit. The table entries are represented as {A,B,C,D,E,F,G,H,I,J,K,L,M,N,O,P} in addresses 0–15 respectively. For example when the index (w,x,y,z) is equal to (0000), the associated table entry is "A". Similarly when the index is (1111), the associated table entry is "P". As noted above, there are circumstances when it is more efficient to invert one or more of the address bits. For example, in some circumstances, it may be advantageous to invert the "w" and "z" address bits. That is the address bits are modified from (w,x,y,z) to (w',x,y,z'). As described above, if one or more bits are inverted the table entries must be rearranged.

One conventional technique for rearranging the table entries requires inverting one bit at a time and processing (rearranging) the table entries for each inversion. FIGS. 2(*a*)–(*b*) are illustrations of an example of a table that is rearranged using a conventional technique. In this example, the original table, (old table) is the table described above with reference to FIG. 1 having the index represented as (w,x,y,z). The modified index is (w',x,y,z'). FIG. 2(*a*) is an illustration of a first intermediate table representing the table after inverting the "w" bit and re-processing the table to match the modified index. The table index illustrated in FIG. 2(*a*) is (w',x,y,z) and the table entries are {I,J,K,L,M,N,O,P,A,B,C,D,E,F,G,H} in addresses 0–15 respectively. Each affected table entry is processed and, if necessary, a new table entry is substituted for an old table entry. However, since only one inverted index bit is processed at one time, the current index, i.e., (w',x,y,z), does not match the index of the new table and an additional table entry rearrangement operation is required. It will be apparent to persons skilled in the art that inverting one address bit affects the locations of all table entries.

FIG. 2(*b*) is an illustration of a new table representing the table after inverting both the "w" and "z" bits of the address index and re-processing the table to match the modified index. The table index illustrated in FIG. 2(*b*) represents the bit values of (w',x,y,z') and the table entries are {J,I,L,K,N, M,P,O,B,A,D, C,F,E,H,G}. It will be apparent that one table rearrangement is required for each bit in the address that is inverted. Therefore, when more than one bit is inverted, as in the above example, each table entry is processed (modified) multiple times, e.g., two table entry modifications are required in the above example. This multiple processing of each table entry is time consuming and inefficient.

Another conventional technique uses an indirect mapping technique to accommodate address bit inversions. In this technique an index map is generated and stored in memory that maps each new index value to an old index value. FIG. 3 is an illustration of an index map generated and stored in memory according to a conventional technique. In FIG. 3 a new index (NI) corresponding to (w',x,y,z') is stored in memory and is associated with the corresponding old index (OI) (w,x,y,z). For example, a new index of (1001) corresponds to the old index of (0000) since in the new index, the w' and the z' bit have been inverted. The entire index map is generated and stored in memory. Thereafter, when a reference to the new address is made, the address corresponding to NI is identified, then the corresponding address in the OI is identified, and then the table entry associated with the identified OI is determined. For example, when an address using the new index values (w',x,y,z') is received, e.g., (1001), the OI corresponding to the NI value (1001) is identified. In this example, the OI that is equal to (0000) is identified with the NI that is equal to (1001). Then the old table entry associated with the OI is determined, e.g., "A". The output of the table lookup ("A") is therefore equal to table entry in the old table (0000) that is associated with the old index identified in the mapping table with the new address (1001). One problem with the index mapping technique is that the new table index map must be stored in memory. It is not uncommon for the size of the index to exceed sixteen bits. Storing a new index map in the memory can quickly consume a large portion of the scarce memory resources since the number of indices in the index map is $2^N$ bits where N is the size of the index in bits. A second problem with the index mapping technique is that, as described above, in order to identify a table entry, two table lookups are necessary, one map index lookup and one table entry lookup. This indirect mapping is inefficient and time consuming. A third problem with the index mapping technique is that conventional systems predefine the index size in order to generate the index maps. For example, in the above example, the computer-based technique used to generate the index map will only operate with four bit index values. It is possible to have techniques for reordering table entries when the number of entries (and hence the number of indicies) will always have a specific length. However, a better solution reorders the table entries when the table size is only determined at run-time, i.e., after the old table and the computer program have been generated. Accordingly, the above technique for generating and storing an index map is not an effective solution in many design environments.

What is needed is a system and method for (1) efficiently identifying inverted bits in an address; (2) utilizing a single technique to rearrange any size table; (3) generating new index bit sequences based upon inverted index bits without utilizing a significant amount of memory resources; and (4) rearranging table entries only once.

SUMMARY OF THE INVENTION

The invention is a computer-based system and method for efficiently identifying inverted bits in an address, utilizing a single technique to rearrange any size table, generating new index bit sequences based upon inverted index bits without utilizing a significant amount of memory resources, and rearranging table entries only once. The present invention utilizes a mask that defines the address bits that are inverted for a new table. The present invention then rearranges the table entries in the old table to form a new table. Once generated the new table can be used in place of the old table thereby requiring no more memory than the old table. Accordingly, the present invention provides a system and method for identifying the index bits to be inverted after the lookup table and computer program have been generated while utilizing significantly less memory than conventional systems and methods.

BRIEF DESCRIPTION OF THE DRAWINGS

FIG. 1 is an illustration of a table (array) having a four bit index.

FIG. 2(*a*) is an illustration of a first intermediate table representing the table after inverting the "w" bit and re-processing of the table to match the modified index.

FIG. 2(*b*) is an illustration of a new table representing the table after inverting the "w" bit and the "z" bit of the table and re-processing of the table to match the modified index.

FIG. 3 is an illustration of an index map generated and stored in memory according to a conventional technique.

FIG. 7 is a table illustrating the values generated by the preferred embodiment of the present invention when rearranging the table entries of the table illustrated in FIG. 1 to the table entries illustrated in FIG. 2(*b*).

DETAILED DESCRIPTION OF THE PREFERRED EMBODIMENT

A preferred embodiment of the present invention is now described with reference to the figures where like reference numbers indicate identical or functionally similar elements. Also in the figures, the left most digit of each reference number corresponds to the figure in which the reference number is first used.

Figure 4:
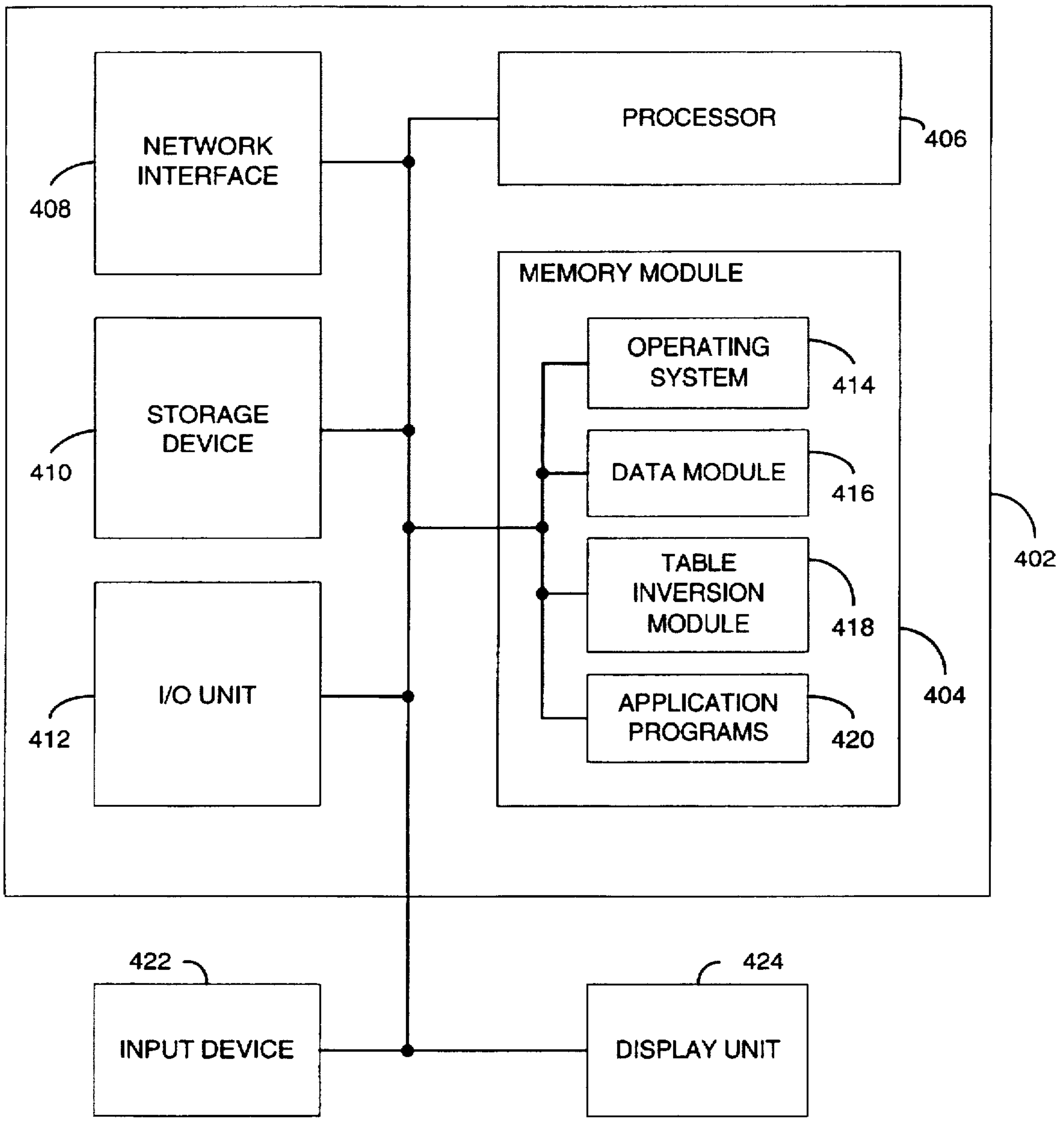
FIG. 4 is an illustration of a computer system in which the preferred embodiment of the present invention resides and operates.

FIG. 4 is an illustration of a computer system in which the preferred embodiment of the present invention resides and operates. The computer system includes a conventional computer 402, such as a SPARC Station 10 commercially available from Sun Microsystems, Santa Clara, Calif. or a IBM compatible personal computer, e.g., commercially available from IBM Corp., Armonk, N.Y. The computer 402 includes a memory module 404, a processor 406, an optional network interface 408, a storage device, and an input/output (I/O) unit 412. In addition, an input device 422 and a display unit 424 can be coupled to the computer. The memory module can be conventional random access memory (RAM) and includes a conventional operating system 414, a data module 416 for storing data, a table inversion module 418, the operation of which is described in greater detail below with respect to FIGS. 5–7, and application programs 420, for example, the Cadence Cobra CAD/CAE simulation program, commercially available from Cadence Design Systems, San Jose, Calif. Although the preferred embodiment of the present invention is described with respect to a CAD/CAE environment, it will be apparent to persons skilled in the art that the system and method of the present invention can be utilized in many different environments without departing from the scope of the present invention. The processor 406 can be a conventional microprocessor, e.g., a Pentium Pro processor commercially available from Intel Corporation, Santa Clara, Calif. The optional network interface 408, the storage device 410, and the I/O unit are all conventional. The input device 422 can be a conventional keyboard that is commercially available from Hewlett Packard, Palo Alto, Calif., or mouse, for example, that is commercially available from Logitech Incorporated, Freemont, Calif. The display unit 424 can be a conventional display monitor that is commercially available from IBM Corporation. A more detailed description of the table inversion module 418 is now set forth with respect to FIGS. 5–7. For clarity, the following description of the method of the present invention does not describe the invention at the electronic signal manipulation level of detail. It will be apparent to persons skilled in the art that the steps such as "setting" a value, for example, correspond to manipulating a signal representing the value and storing the signal in the data module 416.

Figure 5:
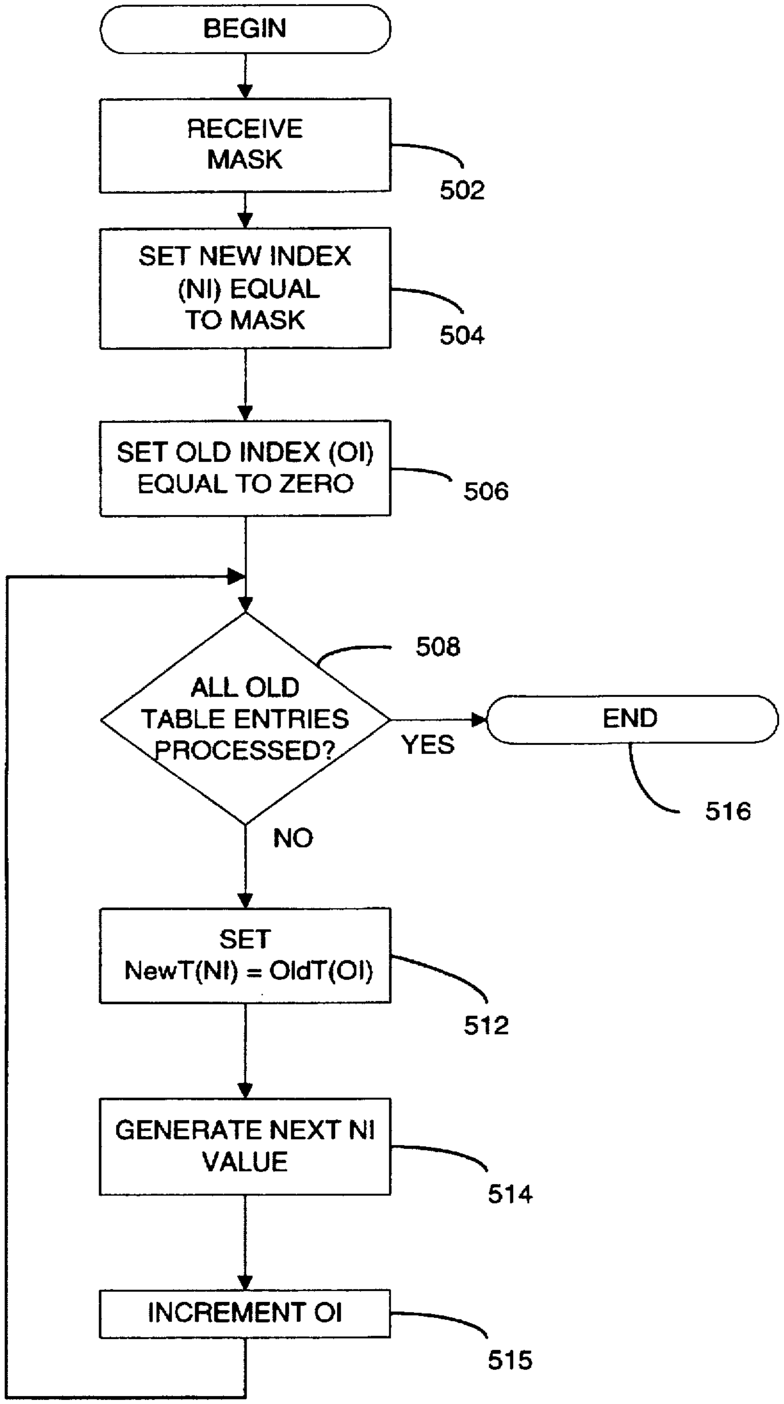
FIG. 5 is a flow chart illustrating the table rearrangement method according to the preferred embodiment of the present invention.

FIG. 5 is a flow chart illustrating the table rearrangement method according to the preferred embodiment of the present invention. The table inversion module 418 receives an inversion mask that identifies the index bits to be inverted. In the preferred embodiment the inversion mask is an integer having N bits (entries), one bit for each of the N bits in the table index. The mask bits are positioned such that each mask bit corresponds to one old index bit of the old table. A mask bit that is equal to a logical one (or a logical zero in an alternate embodiment), represents that the corresponding bit in the old index is inverted to form the new index. Using the above example, if the old table index can be represented as (w,x,y,z) and the new table index can be represented as (w',x,y,z') then the mask is equal to the values set forth in Equation (1), i.e., the binary representation of the integer nine. For clarity, only the four least significant bits of the mask are shown in Equation (1).

Mask=[1001] Equation (1)

The table inversion module 418 then sets 504 the new index equal to the mask and sets 506 the old index equal to zero. If all of the old table entries have been processed 508 then the process is complete. Otherwise, the table inversion module 418 sets 512 the new table entry associated with the new index, e.g., NewT(NI), equal to the old table entry associated with the old index, e.g., OldT(OI). The table inversion module 418 then generates 514 the next NI value and increments 515 the old index value. The table inversion module 418 repeats steps 508 through 515 until all of the old table entries have been processed 508. The process for generating 514 the next NI value is now described with reference to FIGS. 6–7.

Figure 6:
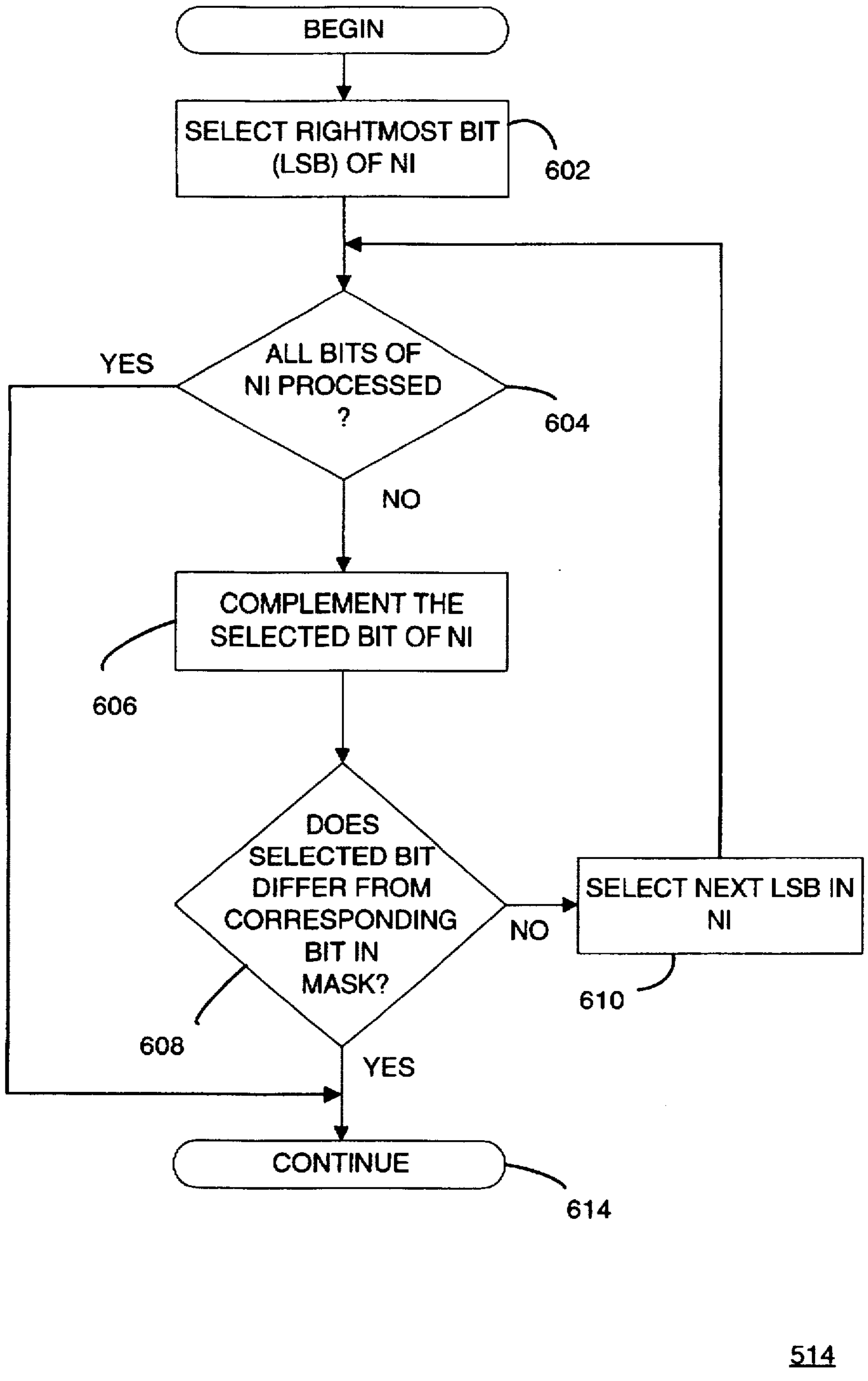
FIG. 6 is a flow chart illustrating the new index generation method according to the preferred embodiment of the present invention.

FIG. 6 is a flow chart illustrating the new index generation method 514 according to the preferred embodiment of the present invention. The table inversion module 418 selects 602 the rightmost bit, i.e., the least significant bit (LSB), of the new index. If all of the new index bits have beet processed 604, the process continues 614. If not all of the NI bits have. been processed 604, the table inversion module 418 complements 606 the selected bit of the NI. The table inversion module 418 determines 608 if the selected bit differs in its binary value from the corresponding bit in the mask. If the selected bit differs from the corresponding bit in the mask, the process continues 614. If the selected bit does not differ from the. corresponding bit in the mask, the table inversion module 418 selects the next least significant bit in the new index, e.g., the next most right bit, and repeats steps 604 through 608. A more detailed description of the operation of the table inversion module 418 is now described with respect to FIG. 7.

FIG. 7 is a table illustrating some of the values generated by the preferred embodiment of the present invention when rearranging the table entries of the table illustrated in FIG. 1 to the table entries illustrated in FIG. 2(*b*). In FIG. 7, the letter in the first column identifies the row, the values in the second column represent the four bit new index value. The values in the third column represent the four bit old index value. The values in the fourth column represent the value of the mask bit corresponding to the selected new index bit. The values in the fifth column represent the value of the old table entry associated with old index (OldT(OI)). The values in the sixth column represent the value of the new table entry associated with new index (NewT(NI)). The example illustrated in FIG. 7 will be described with respect to the flow charts illustrated in FIG. 5 and FIG. 6.

The table inversion module receives the mask. In this example the mask is equal to the mask of Equation (1). That is, the mask is equal to [1001]. The table inversion module 418 then sets 504 the four bit new index value equal to the mask and sets 506 the old index value equal to zero. After completing step 506, the variables identified in FIG. 7 are equal to the values in row (a). The table inversion module 418 determines 508 that not all of the old table entries have been processed, in fact no old table entries have been processed at this time, and sets 512 the new table entry associated with the new index equal to the old table entry equal to the old index, i.e., NewT(1001)=OldT(0000), i.e., NewT(1001)="A" as illustrated in row (b). This is consistent with the table values illustrated in FIG. 2(*b*). If the (w',x,y,z') index is equal to (1001), the new table value is "A".

The table inversion module 418 then generates 514 the next NI value by selecting 602 the rightmost bit of the NI, e.g., "1". The table inversion module 418 then determines 604 that all of the NI bits have not been processed and complements 606 the selected bit of NI. The value of NI is now 1000 as illustrated in row(c). The value of the selected bit, e.g., "0" differs from the corresponding bit in the mask "1", hereafter referred to as the current mask bit. Therefore, the process continues 614 and the table inversion module 418 increments 515 the old index. The result of step 515 is illustrated in row (d). Then the table inversion module 418 determines 508 that all of the old table entries have not been processed and sets 512 NewT(1000) equal to OldT(0001). That is NewT(1000) is set equal to "B". The result of step 512 is illustrated in row (e). This is consistent with the table values illustrated in FIG. 2(*b*). If the (w',x,y,z') index is equal to (1000), the new table value is "B".

The table inversion module 418 then generates 514 the next NI value. The table inversion module 418 selects 602 the rightmost bit of NI, e.g., having a value of "0", determines 604 that all of the NI bits have not been processed, and complements 606 the selected bit of NI. The value of NI is now "1001". The result of step 606 is illustrated in row (f). The table inversion module 418 determines 608 that the value of the selected bit "1" is equal to the value of the current mask bit "1" and selects 610 the next least significant bit, e.g., the next bit to the left, in NI. The table inversion module 418 determines 604 that not all of the NI bits have been processed and complements 606 the selected NI bit. The value of NI is now 1011. The result of step 606 is illustrated in row (g). The table inversion module 418 determines 608 that the value of the selected bit, e.g., "1", is not equal to the value of the current mask bit, e.g., "0". Therefore, the process continues 614 and the table inversion module 418 increments 515 the old index. The result of step 515 is illustrated in row (h). Then the table inversion module 418 determines 508 that all of the old table entries have not yet been processed and sets NewT(1011) equal to OldT (0010). That is, NewT(1011) is set equal to "C". The result of step 512 is illustrated in row (i). This is consistent with the table values illustrated in FIG. 2(*b*). If the (w',x,y,z') index is equal to (1011), the new table value is "C".

The table inversion module 418 then generates 514 the next NI value. The table inversion module 418 selects 602 the rightmost bit of NI, e.g., having a value of "1", determines 604 that not all of the NI bits have been processed and complements 606 the selected NI bit. The value of NI is now 1010. The result of step 606 is illustrated in row (j). The table inversion module 418 determines 608 that the value of the selected bit, e.g., "0", is not equal to the value of the current mask bit, e.g., "1". Therefore, the process continues 614 and the table inversion module 418 increments 515 the old index. The result of step 515 is illustrated in row (k). Then the table inversion module 418 determines 508 that all of the old table entries have not yet been processed and sets NewT(1010) equal to OldT(0011). That is, NewT(1010) is set equal to "D". The result of step 512 is illustrated in row (l). This is consistent with the table values illustrated in FIG. 2(*b*). If the (w',x,y,z') index is equal to (1010), the new table value is "D".

The table inversion module 418 then generates 514 the next NI value. The table inversion module 418 selects 602 the rightmost bit of NI, e.g., having a value of "0", determines 604 that all of the NI bits have not been processed, and complements 606 the selected bit of NI. The value of NI is now "1011". The result of step 606 is illustrated in row (m). The table inversion module 418 determines 608 that the value of the selected bit "1" is equal to the value of the current mask bit "1" and selects 610 the next least significant bit, e.g., the next bit to the left, in NI. The table inversion module 418 determines 604 that not all of the NI bits have been processed and complements 606 the selected NI bit. The value of NI is now 1001. The result of step 606 is illustrated in row (n). The table inversion module 418 determines 608 that the value of the selected bit "0" is equal to the value of the current mask bit, e.g., the second least significant bit "0", and selects 610 the next (third) least significant bit, e.g., the next bit to the left, in NI. The table inversion module 418 determines 604 that not all of the NI bits have been processed and complements 606 the selected NI bit. The value of NI is now 1101. The result of step 606 is illustrated in row (o). The table inversion module 418 determines 608 that the value of the selected bit, e.g., "1", is not equal to the value of the current mask bit, e.g., "0". Therefore, the process continues 614 and the table inversion module 418 increments 515 the old index. The result of step 515 is illustrated in row (p). Then the table inversion module 418 determines 508 that all of the old table entries have not yet been processed and sets NewT(1101) equal to OldT (0100). That is, NewT(1101) is set equal to "E". The result of step 512 is illustrated in row (q). This is consistent with the table values illustrated in FIG. 2(*b*). If the (w',x,y,z') index is equal to (1101), the new table value is "E". The remaining operation of the method of the preferred embodiment for this example will be apparent to persons of ordinary skill in the art.

One example of the implementation of the present invention using the C programming language is set forth below in Table 1.

TABLE 1

```
void trans__table(
int upper, /* input: number of enties in each table */
int inv, /*input: inversion mask relative to new */
                    /* table bit positions */
int *old__table,    /*input: the old table */
int *new__table)    /*output: the rearranged table */
{int m;
int oi;             /* index to old table */
int ni = inv;       /* index to new table */
for(oi=0; oi<upper; oi++) /*do over all old entries */
{new__table[ni]=old__table[oi]; /* copy entry */
for(m=1; i<upper; m<<=1)
{ni ^= m;
if((ni & m) != (inv & m)) break;
   }
  }
 }
```

It will be apparent to persons skilled in the art that alternate embodiments can be discerned from the above description. Three independent variations of the preferred embodiments include: (1) varying the value of the new index linearly while determining the value of the old index associated with the new index (in contrast to the preferred embodiment, described above, in which the old index is varied (incremented) linearly while the new index is determined); (2) the index that is varied linearly can begin at the bottom of the table, e.g., with a value of zero, and be incremented or at the top of the table, e.g., with a value of 1111 and be decremented; and (3) the mask can be complemented. The operation of all permutations of these three independent variations will be apparent to persons of ordinary skill in the art in light of the detailed description of the preferred embodiment set forth above. For example, instead of initializing 506 the old index to zero and incrementing 515 the old index, in one alternate embodiment, the old index is set to (1111) and decremented by one in step 612. To perform the alternate embodiment the mask can be inverted bit-wise, e.g., (0110).

While the present invention has been particularly shown and described with reference to a preferred embodiment, it will be understood by persons skilled in the relevant art that various changes in form and details can be made therein without departing from the spirit and scope of the invention.

What is claimed is:

1. A computer based method for generating signals representing data in a new data structure in response to an inversion of one or more input signals, the data in the new data structure associated with signals representing a first index, the data in the new data structure being equal to data in an old data structure associated with signals representing a second index, a reordering mask having a plurality of bits including one or more active mask bits representing the inverted input signals, the method comprising the steps of:

(a) setting the value of the first index to the value of the reordering mask;

(b) setting the value of the second index equal to a first value;

(c) setting an element of the new array associated with the value of the first index equal to an element of the old array associated with the value of the second index;

(d) determining a new value for the first index, having the steps of:

(i) selecting a first bit in said first index as a selected bit;

(ii) inverting said selected bit;

(iii) selecting another bit in said first index as a selected bit and repeating steps (ii)–(iii) if the value of said selected bit is equal to the value of a mask bit in the reordering mask corresponding to the selected bit;

(e) modifying the value of the second index if the value of said selected bit is not equal to the value of a mask bit in the reordering mask corresponding to the selected bit;

(f) repeating steps (b) through (f) for each second index signal.

2. The computer based method of claim 1, wherein said second index is modified sequentially in step (e).

3. The computer based method of claim 1, wherein said second index is increased sequentially in step (e).

4. The computer based method of claim 1, wherein said second index is decreased sequentially in step (e).

5. The computer based method of claim 1, wherein each bit in the reordering mask corresponds to one bit in each of the first and second indicies, and identifies bits in the second index that are inverted.

6. A computer based method for generating signals representing data in a new data structure in response to an inversion of one or more input signals, the data in the new data structure associated with signals representing a first index, the data in the new data structure being equal to data in an old data structure associated with signals representing a second index, a reordering mask having a plurality of bits including one or more active mask bits representing the inverted input signals, the method comprising the steps of:

(a) setting the value of the second index to the value of the reordering mask;

(b) setting the value of the first index equal to a first value;

(c) setting an element of the new array associated with the value of the first index equal to an element of the old array associated with the value of the second index;

(d) determining a new value for the second index, having the steps of:

(i) selecting a first bit in said second index as a selected bit;

(ii) inverting said selected bit;

(iii) selecting another bit in said first index as a selected bit and repeating steps (ii)–(iii) if the value of said selected bit is equal to the value of a mask bit in the reordering mask corresponding to the selected bit; and (e) modifying the value of the first index if the value of said selected bit is not equal to the value of a mask bit in the reordering mask corresponding to the selected bit;

(f) repeating steps (b) through (f) for each second index signal.

7. The computer based method of claim 6, wherein said first index is modified sequentially in step (e).

8. The computer based method of claim 6, wherein said first index is increased sequentially in step (e).

9. The computer based method of claim 6, wherein said first index is decreased sequentially in step (e).

10. A computer system for generating signals representing data in a new data structure in response to an inversion of one or more input signals, comprising:

a processor;

a memory module, adapted to receive signals from said processor, including:

a first index associated with data in the new data structure, a second index associated with data in an old data structure, and a reordering mask having a plurality of bits including one or more active mask bits representing the inverted input signals;

first setting means, adapted to receive signals from said memory module, for setting the value of said first index to the value of said reordering mask;

second setting means, adapted to receive signals from said memory module, for setting the value of the second index equal to a first value;

third setting means, adapted to receive signals from said memory module, for setting an element of the new array associated with the value of the first index equal to an element of the old array associated with the value of the second index;

first determining means, adapted to receive signals from said memory module, for determining a new value for the first index, including:

first selecting means, adapted to receive signals from said memory module, for selecting a first bit in said first index as a selected bit, inverting means, adapted to receive signals from said memory module, for inverting said selected bit, second determining means, adapted to receive signals from said memory module, for determining if the value of said selected bit is equal to the value of a mask bit in the reordering mask corresponding to the selected bit, and second selecting means, adapted to receive signals from said determining means, for selecting another bit in said first index as a selected bit; and modifying means, adapted to receive signals from said determining means, for modifying the value of the second index if the value of said selected bit.

11. The computer system of claim 10, wherein said modifying means sequentially modifies said second index.

12. The computer system of claim 10, wherein said modifying means sequentially increases said second index.

13. The computer system of claim 10, wherein said modifying means sequentially decreases said second index.

14. The computer system of claim 10, wherein each bit in the reordering mask corresponds to one bit in each of the first and second indicies, and identifies bits in the second index that are inverted.

* * * * *